(12) United States Patent
Kikuchi

(10) Patent No.: US 10,346,102 B2
(45) Date of Patent: Jul. 9, 2019

(54) INFORMATION PROCESSING APPARATUS THAT CONTROLS INSTALL OF A DEVICE DRIVER IN ACCORDANCE WITH CAPABILITY OF AN OPERATING SYSTEM, INSTALLATION METHOD, AND STORAGE MEDIUM

(71) Applicant: CANON KABUSHIKI KAISHA, Tokyo (JP)

(72) Inventor: Hiroshi Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/375,461

(22) Filed: Dec. 12, 2016

(65) Prior Publication Data
US 2017/0185358 A1    Jun. 29, 2017

(30) Foreign Application Priority Data
Dec. 24, 2015   (JP) .................................. 2015-252410

(51) Int. Cl.
*G06F 3/12* (2006.01)
*G06F 9/4401* (2018.01)
*H04N 1/00* (2006.01)

(52) U.S. Cl.
CPC .......... *G06F 3/1209* (2013.01); *G06F 3/1204* (2013.01); *G06F 3/1225* (2013.01); *G06F 3/1285* (2013.01); *G06F 9/4411* (2013.01); *G06F 9/4413* (2013.01); *H04N 1/00962* (2013.01)

(58) Field of Classification Search
CPC .... G06F 3/1225; G06F 3/1254; G06F 3/1276; G06F 3/1209; G06F 13/102; G06F 9/4411; G06F 3/1204; H04N 1/00962
See application file for complete search history.

(56) References Cited

U.S. PATENT DOCUMENTS

| | | | | |
|---|---|---|---|---|
| 8,132,186 B1* | 3/2012 | Okcu | .................... | G06F 13/102 719/327 |
| 8,368,915 B1* | 2/2013 | Feeser | .................... | G06F 9/4411 347/19 |
| 2002/0124245 A1* | 9/2002 | Maddux | .................... | G06F 8/60 717/176 |
| 2004/0093491 A1* | 5/2004 | Ebata | .................... | G06F 9/4411 713/100 |
| 2007/0169129 A1* | 7/2007 | Polivy | ................. | G06F 9/44505 719/327 |
| 2008/0127165 A1* | 5/2008 | Mullis | ................... | G06F 9/4415 717/173 |
| 2009/0320014 A1* | 12/2009 | Sudhakar | ............ | G06F 9/45533 717/169 |
| 2011/0102830 A1* | 5/2011 | Naitoh | ................... | G06F 3/1225 358/1.15 |

(Continued)

FOREIGN PATENT DOCUMENTS

JP    2007-097156 A    4/2007

*Primary Examiner* — Benny Q Tieu
*Assistant Examiner* — Juan M Guillermety
(74) *Attorney, Agent, or Firm* — Venable LLP

(57) ABSTRACT

When a PnP ID for a printer driver of an architecture that cannot be used is designated, the printer driver cannot be plug and play installed. Accordingly, a driver different to the driver corresponding to the PnP ID designated by the printer is installed in accordance with the capabilities of the OS.

10 Claims, 12 Drawing Sheets

(56) References Cited

U.S. PATENT DOCUMENTS

| | | | |
|---|---|---|---|
| 2012/0026551 A1* | 2/2012 | Tarumi | G06F 3/1225 358/1.15 |
| 2012/0092721 A1* | 4/2012 | Jaudon | G06F 3/1225 358/1.15 |
| 2013/0014100 A1* | 1/2013 | Akiyama | G06F 8/61 717/176 |
| 2013/0063742 A1* | 3/2013 | Kikuchi | G06F 3/1205 358/1.11 |
| 2014/0233050 A1* | 8/2014 | Kishida | G06F 3/1225 358/1.13 |
| 2015/0242195 A1* | 8/2015 | Omura | G06F 13/105 719/327 |
| 2015/0248263 A1* | 9/2015 | Hattori | G06F 3/1225 358/1.15 |
| 2017/0017444 A1* | 1/2017 | Hirano | G06F 3/1225 |

* cited by examiner

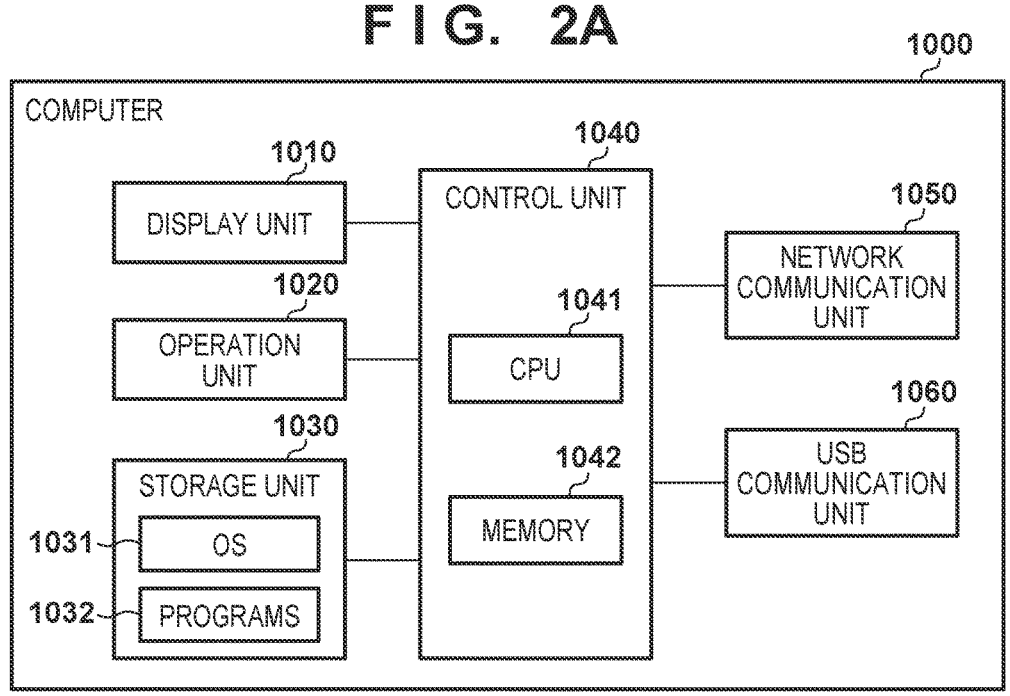
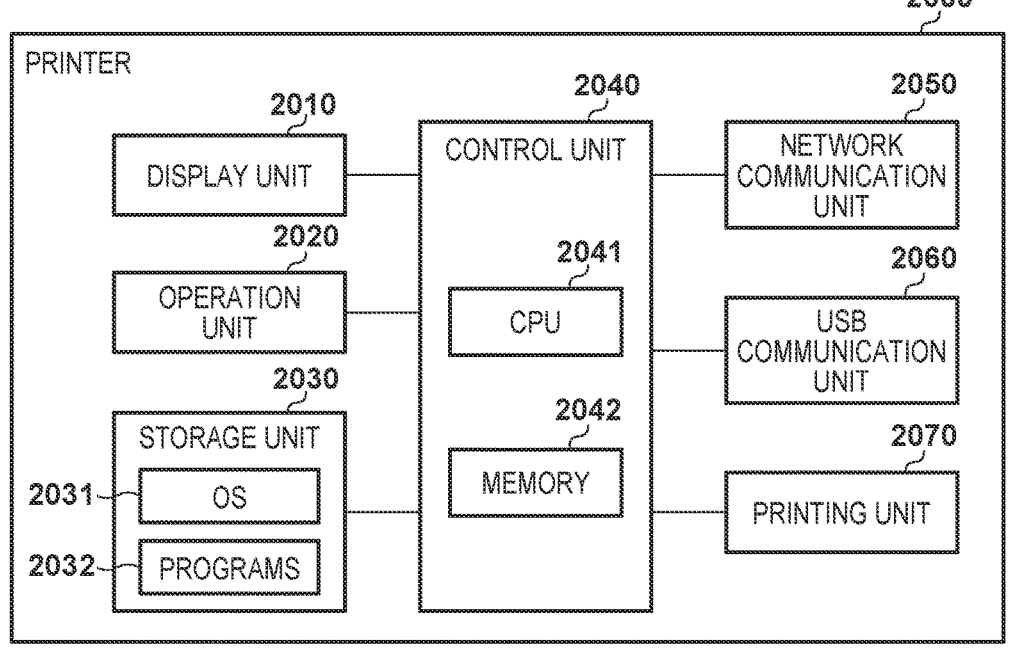

FIG. 5A

FIRST V3 SET UP INFORMATION                                           1120

```
5101  [Version]
5102  Class=Printer
5103  Provider=%OEM%
5104  DriverVer=MM/DD/YYYY,XX.XX.XX.XX 5106  [Manufacturer]
5107  "Company Name"=Company_Name 5109  [Company_Name]
5110  "PDL1 Printer"      = PDL1, WSDPRINT\PDL1(V3)
5111  "PDL1 Printer"      = PDL1, USBPRINT\PDL1(V3)

(BELOW OMITTED)
```

FIG. 5B

SECOND V3 SET UP INFORMATION                                          1130

```
5201  [Version]
5202  Class=Printer
5203  Provider=%OEM%
5204  DriverVer=MM/DD/YYYY,XX.XX.XX.XX 5206  [Manufacturer]
5207  "Company Name"=Company_Name 5209  [Company_Name]
5210  "PDL1 Printer"      = PDL1, WSDPRINT\PDL1(V3)
5211  "PDL1 Printer"      = PDL1, USBPRINT\PDL1(V3)
5212  "PDL1 Printer"      = PDL1, WSDPRINT\PDL1(V4)
5213  "PDL1 Printer"      = PDL1, USBPRINT\PDL1(V4)

(BELOW OMITTED)
```

FIG. 6A

FIRST V4 SET UP INFORMATION 1140

```
6101  [Version]
6102  Class=Printer
6103  Provider=%OEM%
6104  ClassVer=4.0
6105  DriverVer=MM/DD/YYYY,XX.XX.XX.XX 6107  [Manufacturer]
6108  "Company Name"=Company_Name 6110  [Company_Name]
6111  "PDL1 Printer V4"      = PDL1, WSDPRINT\PDL1(V4)
6112  "PDL1 Printer V4"      = PDL1, USBPRINT\PDL1(V4)

(BELOW OMITTED)
```

FIG. 6B

SECOND V4 SET UP INFORMATION 1150

```
6201  [Version]
6202  Class=Printer
6203  Provider=%OEM%
6204  ClassVer=4.0
6205  DriverVer=MM/DD/YYYY,XX.XX.XX.XX 6207  [Manufacturer]
6208  "Company Name"=Company_Name 6210  [Company_Name]
6211  "PDL1 Printer V4"      = PDL1, WSDPRINT\PDL1(V4)
6212  "PDL1 Printer V4"      = PDL1, USBPRINT\PDL1(V4)
6213  "PDL1 Printer V4"      = PDL1, WSDPRINT\PDL1(V3)
6214  "PDL1 Printer V4"      = PDL1, USBPRINT\PDL1(V3)

(BELOW OMITTED)
```

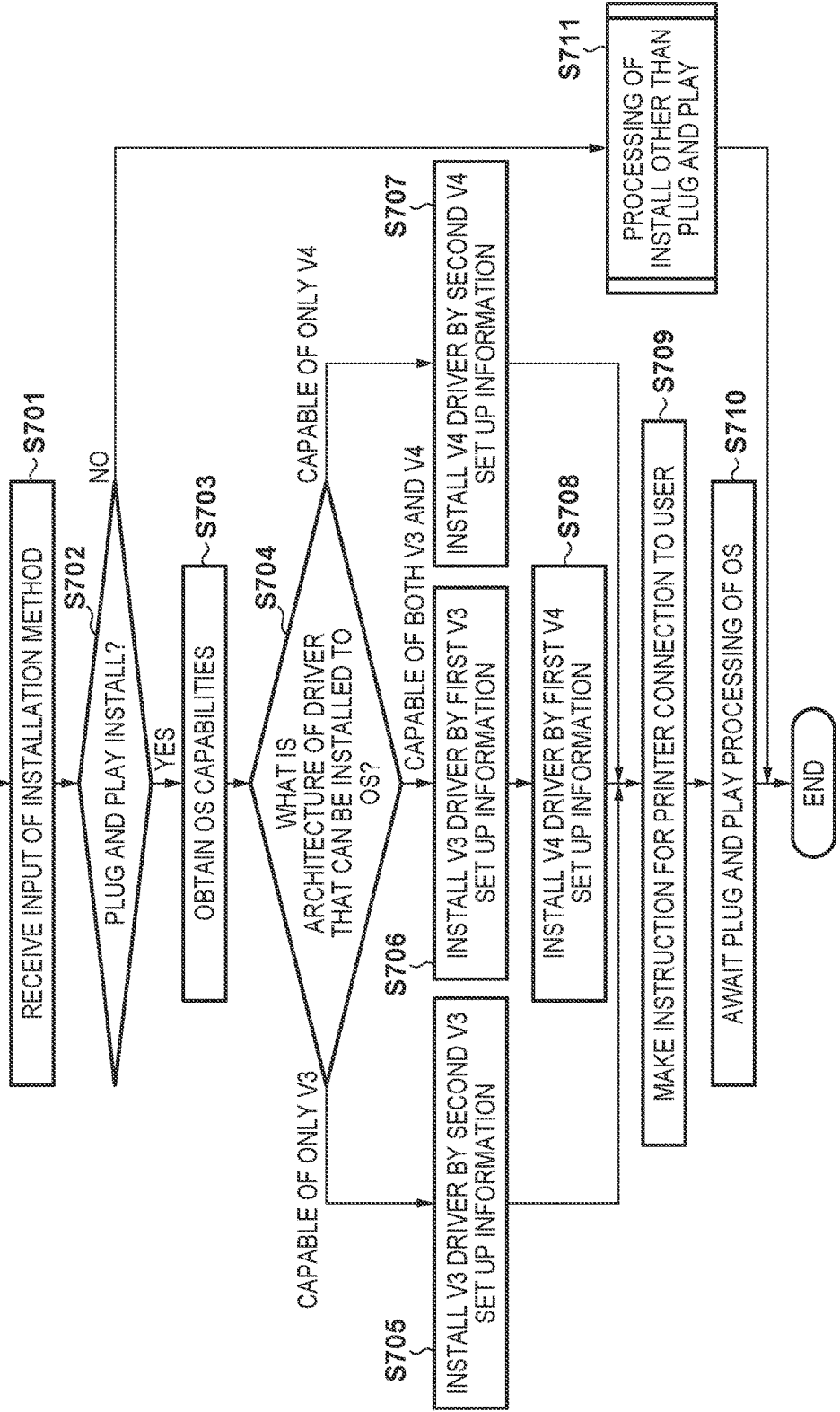

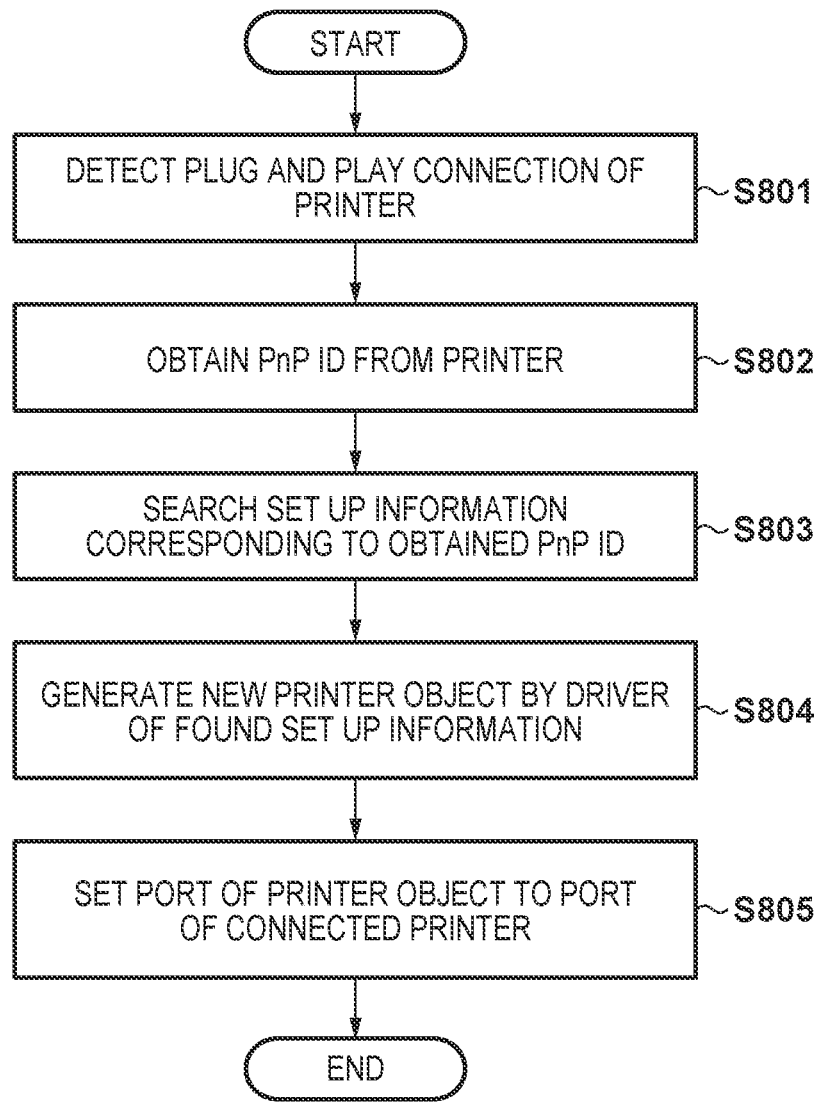

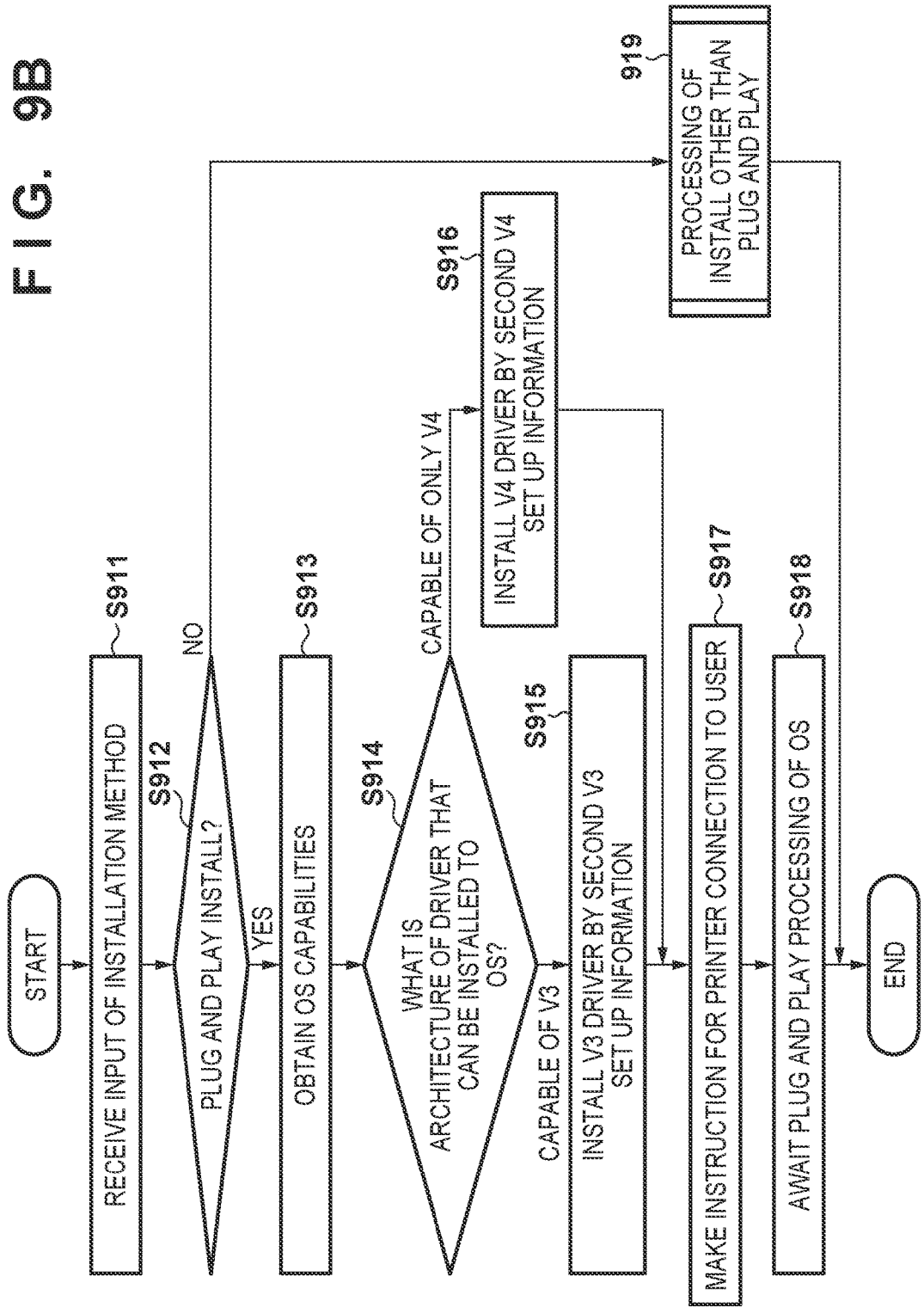

FIG. 11A

THIRD V3 SET UP INFORMATION    1220

```
7101  [Version]
7102  Class=Printer
7103  Provider=%OEM%
7104  DriverVer=MM/DD/YYYY,XX.XX.XX.XX 7106  [Manufacturer]
7107  "Company Name"=Company_Name, OS_A,OS_B 7109  [Company_Name.OS_A]
7110  "PDL1 Printer"      = PDL1, WSDPRINT\PDL1(V3)
7111  "PDL1 Printer"      = PDL1, USBPRINT\PDL1(V3)
7112  "PDL1 Printer"      = PDL1, WSDPRINT\PDL1(V4)
7113  "PDL1 Printer"      = PDL1, USBPRINT\PDL1(V4)

7115  [Company_Name.OS_B]
7116  "PDL1 Printer"      = PDL1, WSDPRINT\PDL1(V3)
7117  "PDL1 Printer"      = PDL1, USBPRINT\PDL1(V3)

(BELOW OMITTED)
```

FIG. 11B

THIRD V4 SET UP INFORMATION    1230

```
7201  [Version]
7202  Class=Printer
7203  Provider=%OEM%
7204  ClassVer=4.0
7205  DriverVer=MM/DD/YYYY,XX.XX.XX.XX 7207  [Manufacturer]
7208   "Company Name"=Company_Name, OS_B,OS_C 7210  [Company_Name.OS_B]
7211  "PDL1 Printer V4"   = PDL1, WSDPRINT\PDL1(V4)
7212  "PDL1 Printer V4"   = PDL1, USBPRINT\PDL1(V4)

7214  [Company_Name.OS_C]
7215  "PDL1 Printer V4"   = PDL1, WSDPRINT\PDL1(V4)
7216  "PDL1 Printer V4"   = PDL1, USBPRINT\PDL1(V4)
7217  "PDL1 Printer V4"   = PDL1, WSDPRINT\PDL1(V3)
7218  "PDL1 Printer V4"   = PDL1, USBPRINT\PDL1(V3)

(BELOW OMITTED)
```

INFORMATION PROCESSING APPARATUS THAT CONTROLS INSTALL OF A DEVICE DRIVER IN ACCORDANCE WITH CAPABILITY OF AN OPERATING SYSTEM, INSTALLATION METHOD, AND STORAGE MEDIUM

BACKGROUND OF THE INVENTION

Field of the Invention

The present invention relates to an information processing apparatus and an installation control method and particularly relates to a plug and play technique for setting an operation environment of a computer peripheral apparatus.

Description of the Related Art

A technique called plug and play in which a peripheral device becomes usable by an appropriate driver being automatically installed to a computer by simply connecting the peripheral device to the computer. Meanwhile, printers which support a plurality of PDLs (Page Description Languages) exist. In these printers, a plug and play ID (PnP ID) for each corresponding PDL is used to cause plug and play to be implemented in the computer, and printer drivers for all PDLs that are supported can be installed on the computer. However, for a user who can only use a specific PDL, a printer driver for an unused PDL is not necessary. For this reason, a technique in which it is possible for a user on a printer to be allowed to select what PDL plug and play is caused to occur is known, as disclosed in Japanese Patent Laid-Open No. 2007-097156.

Also, in recent years, there exist printer drivers having a different architectures operating on a same OS such as a V3 printer driver, a V4 printer driver, and the like in a Windows (registered trademark) OS (Operating System). In a method described in Japanese Patent Laid-Open No. 2007-097156, there are printers in which users are allowed to select a PnP ID including which architecture printer driver is used since appearance or usage method differ for printer drivers of different architectures.

However, it can be considered that in the future that OSes will cease to support printer drivers of old architectures. In the method described in Japanese Patent Laid-Open No. 2007-097156, a problem arises in that when a PnP ID for a printer driver of an unsupported, old architecture is set for a printer, that printer driver will cease to be installable by plug and play in a future OS. While a plug and play install becomes possible by a user changing a PnP ID to a PnP ID for a printer driver of a new architecture, this is cumbersome. Note, the printer is only an example of a peripheral apparatus, and the same is true for other peripheral apparatuses.

SUMMARY OF THE INVENTION

The present invention was made in view of the above-described conventional example, and provides an information processing apparatus and an installation control method capable of installing an appropriate printer driver by plug and play without reselection of a target of the plug and play.

The present invention has the following configuration.

According to a first aspect of the present invention, there is provided an information processing apparatus that controls, using driver files that include information for constructing device drivers of two architectures, which are a new architecture and an old architecture, for a peripheral apparatus, and set up information files that include set up information for the respective device drivers of the two architectures, an install of at least one of the device drivers of the two architectures, the information processing apparatus comprising: a obtainment unit configured to obtain capability information of an operating system that is to be an install environment of a device driver; and a control unit configured to control, using a driver file, the install of at least one of the device drivers of the two architectures based on the obtained capability information, wherein the control unit controls, in a case when it is determined that the operating system is an operating system that can install either of the device drivers of the two architectures in accordance with the obtained capability information, or, in a case when it is determined that the operating system is an operating system that can install only a device driver of the new architecture in accordance with the obtained capability information, to install the device driver of the new architecture, and a set up of the installed device driver of the new architecture is performed by using set up information for the device driver of the new architecture for the peripheral apparatus in a case when it is determined that the operating system is an operating system that can install only the device driver of the new architecture in accordance with the obtained capability information and identification information corresponding to a device driver of the old architecture is obtained from the peripheral apparatus.

According to a second aspect of the present invention, there is provided an information processing apparatus that controls, using driver files that include information for constructing device drivers of two architectures, which are a new architecture and an old architecture, for a peripheral apparatus, and set up information files that include set up information for the respective device drivers of the two architectures, an install of at least one of the device drivers of the two architectures, the information processing apparatus comprising: an obtainment unit configured to obtain capability information of an operating system that is to be an install environment of a device driver; and a control unit configured to control, using a driver file, the install of at least one of the device drivers of the two architectures based on the obtained capability information, wherein the control unit controls, in a case when it is determined that the operating system is an operating system that can install either of the device drivers of the two architectures in accordance with the obtained capability information, or, in a case when it is determined that the operating system is an operating system that can install only a device driver of the old architecture in accordance with the obtained capability information, to install the device driver of the old architecture, and a set up of the installed device driver of the old architecture is performed by using set up information for the device driver of the old architecture for the peripheral apparatus in a case when it is determined that the operating system is an operating system that can install only the device driver of the old architecture in accordance with the obtained capability information and identification information corresponding to a device driver of the new architecture is obtained from the peripheral apparatus.

According to a third aspect of the present invention, there is provided an installation control method that controls, using driver files that include information for constructing device drivers of two architectures, which are a new architecture and an old architecture, for a peripheral apparatus, and set up information files that include set up information for the respective device drivers of the two architectures, an install of at least one of the device drivers of the two architectures, the method comprising: obtaining capability information of an operating system that is to be an install environment of a device driver; and controlling, using a driver file, the install of at least one of the device drivers of the two architectures based on the obtained capability information, wherein in the controlling, control is performed, in a case when it is determined that the operating system is an operating system that can install either of the device drivers of the two architectures in accordance with the obtained capability information, or, in a case when it is determined that the operating system is an operating system that can install only a device driver of the new architecture in accordance with the obtained capability information, to install the device driver of the new architecture, and a set up of the installed device driver of the new architecture is performed by using set up information for the device driver of the new architecture for the peripheral apparatus in a case when it is determined that the operating system is an operating system that can install only the device driver of the new architecture in accordance with the obtained capability information and identification information corresponding to a device driver of the old architecture is obtained from the peripheral apparatus.

According to a forth aspect of the present invention, there is provided an installation control method that controls, using driver files that include information for constructing device drivers of two architectures, which are a new architecture and an old architecture, for a peripheral apparatus, and set up information files that include set up information for the respective device drivers of the two architectures, an install of at least one of the device drivers of the two architectures, the method comprising: obtaining capability information of an operating system that is to be an install environment of a device driver; and controlling, using a driver file, the install of at least one of the device drivers of the two architectures based on the obtained capability information, wherein in the controlling, control is performed, in a case when it is determined that the operating system is an operating system that can install either of the device drivers of the two architectures in accordance with the obtained capability information, or, in a case when it is determined that the operating system is an operating system that can install only a device driver of the old architecture in accordance with the obtained capability information, to install the device driver of the old architecture, and a set up of the installed device driver of the old architecture is performed by using set up information for the device driver of the old architecture for the peripheral apparatus in a case when it is determined that the operating system is an operating system that can install only the device driver of the old architecture in accordance with the obtained capability information and identification information corresponding to a device driver of the new architecture is obtained from the peripheral apparatus.

By virtue of the present invention, it is possible to install an appropriate printer driver by plug and play without reselection of a target of the plug and play.

Further features of the present invention will become apparent from the following description of exemplary embodiments with reference to the attached drawings.

BRIEF DESCRIPTION OF THE DRAWINGS

FIG. 2A is a view for illustrating a configuration of the computer.

FIG. 2B is a view for illustrating a configuration of the printer.

FIG. 5A and FIG. 5B are views for illustrating contents of first and second V3 set up information files.

FIG. 6A and FIG. 6B are views for illustrating contents of first and second V4 set up information files.

FIG. 7 is a plug and play install processing flow of an installer of the first embodiment.

FIG. 8 is a flow diagram of plug and play processing of an OS.

FIG. 9A and FIG. 9B are plug and play install processing flows of an installer of the second embodiment.

FIG. 11A and FIG. 11B are views for illustrating contents of third V3 and V4 set up information files.

DESCRIPTION OF THE EMBODIMENTS

Hereinafter, embodiments for working the present invention are described using drawings.

<A System Comprising a Computer and a Peripheral Apparatus>

Figure 1A:
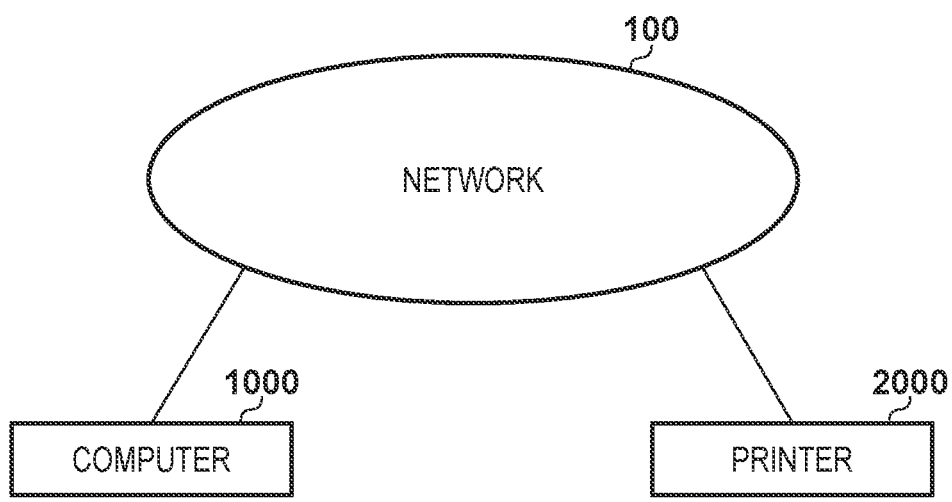
FIG. 1A and FIG. 1B are views for illustrating a connection configuration between a computer and a printer.
Figure 1B:

FIG. 1A and FIG. 1B are views for illustrating a connection configuration between a printer 2000 and a computer 1000 which is an information processing apparatus in a first embodiment. Here, description will be given using a printer as an example of a peripheral apparatus. In FIG. 1A, the computer 1000 and the printer 2000 are connected to a network 100. Although the present embodiment is something that relates to plug and play, FIG. 1A is an example of a network plug and play by WSD (Web Services on Devices) Discovery. Meanwhile, FIG. 1B is a view for illustrating a connection configuration between the printer 2000 and the computer 1000 in USB plug and play. The computer 1000 and the printer 2000 are connected by a USB cable 200. If the present embodiment accords to plug and play, execution is possible and does not change between when it is a network connection and when it is a USB connection.

FIG. 2A and FIG. 2B are views for illustrating configurations of the computer 1000 and the printer 2000 respectively as block diagrams. Firstly, description will be given regarding the configuration of the computer 1000 in the first embodiment. In FIG. 2A, for the computer 1000, a control unit 1040 which includes a CPU 1041 and a memory 1042 controls the whole. A display unit 1010 represents an output apparatus such as a display and an operation unit 1020 represents an input apparatus such as a mouse and keyboard. Also, software such as an OS (operating system) 1031 and various programs 1032 are saved in a storage unit 1030. These programs are loaded to the memory 1042 as necessary and are executed by the CPU 1041. The OS 1031 is software which manages basic operations of the computer 1000. In the various programs 1032, a device driver such as a printer driver, and an installer program for installing a device driver are included. A network communication unit 1050 performs input and output of data with an external apparatus by connecting to the network 100. A USB communication unit 1060 performs input and output of data with an external apparatus such as a peripheral apparatus connected by a USB (Universal Serial Bus). In the first embodiment, processing of the computer 1000 is all realized by loading the software stored in the storage unit 1030 to the memory 1042 in the control unit 1040 and the CPU 1041 executing the software. Note, CPU is an abbreviation of Central Processing Unit.

Next, description will be given of a configuration of the printer 2000 in the first embodiment with reference to FIG. 2B. For the printer 2000, a control unit 2040 which includes a CPU 2041 and a memory 2042 controls the whole. A display unit 2010 represents an output apparatus such as a panel and an operation unit 2020 represents an input apparatus such as a touch panel and various buttons. These user interface devices are used so that an operation such as a setting of a PnP ID can be performed. Also, an OS 2031 and various programs 2032 are saved in a storage unit 2030. This software is loaded to the memory 2042 as necessary and are executed by the CPU 2041. The OS 2031 is software which manages basic operations of the printer 2000. A network communication unit 2050 performs input and output of data with an external apparatus by connecting to the network 100. A USB communication unit 2060 performs input and output of data with an external apparatus such as a computer connected by USB. A printing unit 2070 performs a print by forming a target image onto physical sheets by causing toner or ink to be fixed onto the sheets according to an instruction of the control unit 2040. In the first embodiment, processing of the printer 2000 is all realized by loading the software stored in the storage unit 2030 to the memory 2042 in the control unit 2040 and the CPU 2041 executing the software.

<PnP ID Selection>

Figure 3:
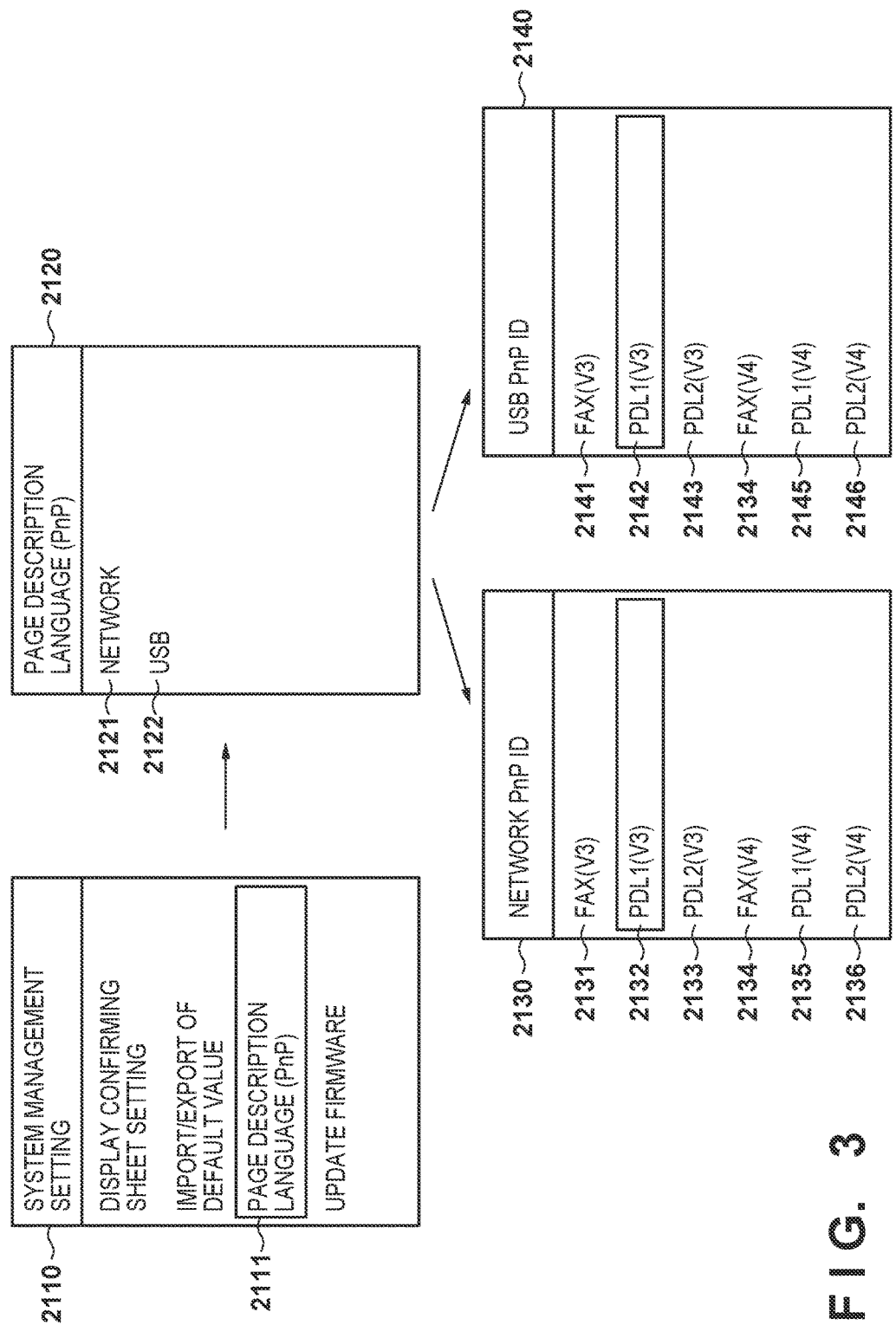
FIG. 3 is a view for illustrating a UI transition of a printer panel for allowing selection of a PnP ID.

FIG. 3 is a view for illustrating a transition of a user interface (UI) on a panel for allowing a user to select a PnP ID. A selected PnP ID is stored in a non-volatile area of the memory 2042 or the storage unit 2030 for example, and notification of it is made to a host apparatus such as a computer as identification information corresponding to a device driver installed by PnP. Here, the illustrated user interfaces are displayed on a panel which is the display unit 2010 of the printer 2000 and transition is made after accepting an input from the user by the operation unit 1020 which may be a touch panel or various buttons. A "system management setting" 2110 is a UI for setting various system management of the printer 2000. In the present embodiment, a PnP ID setting becomes possible by a system administrator selecting "page description language (PnP)" 2111. The UI after selection is a "page description language (PnP)" 2120 screen. Here, a PnP ID can be designated for "network" 2121 and "USB" 2122 respectively.

The UI after "network" 2121 is selected is a "network PnP ID" 2130 screen. A system administrator of the printer 2000 designates a PnP ID for which a network plug and play is desired to be allowed on that screen. The printer 2000 transmits the PnP ID designated here to the computer at a time of a connection with the computer 1000. Although a default setting is a "PDL1 (V3)" 2132, here, IDs that the printer 2000 can use as a PnP ID are all listed. "FAX (V3)" 2131 is a PnP ID for connecting a V3 architecture facsimile driver (FAX driver) that operates on the computer 1000 by plug and play. A network PnP ID setting of the printer 2000 is changed to "FAX (V3)" and the screen returns to "page description language (PnP)" 2120 when the system administrator selects the "FAX (V3)" 2131.

Similarly, the "PDL1 (V3)" 2132 and a "PDL2 (V3)" 2133 are PnP IDs for connecting a driver for PDL1 and a driver for PDL2 of a V3 architecture respectively by plug and play. Similarly, a "FAX (V4)" 2134, a "PDL1 (V4)" 2135, and a "PDL2 (V4)" 2136 are PnP IDs for connecting the respective drivers of the respective V4 architecture by plug and play. In this way, there exists printer drivers corresponding to each PnP ID respectively, and the printer driver automatically installed to the computer 1000 after connection can be controlled by the system administrator selecting a PnP ID.

Here, a simple description will be given regarding printer drivers of a V3 architecture and a V4 architecture. For a printer driver of a V3 architecture and a printer driver of a V4 architecture, a file configuration and a UI are different, and they are clearly distinguished on a Windows (registered trademark) OS 1031. V3 is an old architecture and V4 is a new architecture, and the V4 architecture is of a more secure, durable structure than the V3 architecture. Also, for a V4 architecture printer driver, affinity with the latest applications is high compared to a V3 architecture printer driver. A PDL is a page description language, and indicates a data format in which to output to a printer. Printer drivers of a V3 architecture and a V4 architecture respectively can be created even with the same PDL. Also, a plurality of versions for the printer drivers exist and a version update can be performed in order to add functions or correct malfunctions. In the operating system, whether it is possible to install both new and old architectures of V3 and V4 or just one of them may depend on their versions. In other words, the operating system is an install environment in which device drivers are installed, and a device driver that can be installed may change in accordance with the environment.

Here, the UI after selection of "USB" 2122 on the screen 2120 is a "USB PnP ID" 2140 screen. Here, description is omitted because the content is the same as for "network PnP ID" 2130. As described above, in the present embodiment, configuration may be taken such that the system administrator of the printer 2000 designates a separate PnP ID in each of a network connection and a USB connection. Furthermore, designating a PnP ID of a desired device driver out of a plurality of installable device drivers and causing it to be stored in the printer 2000 is possible in each connection method.

<Driver Install Set>

Figure 4:
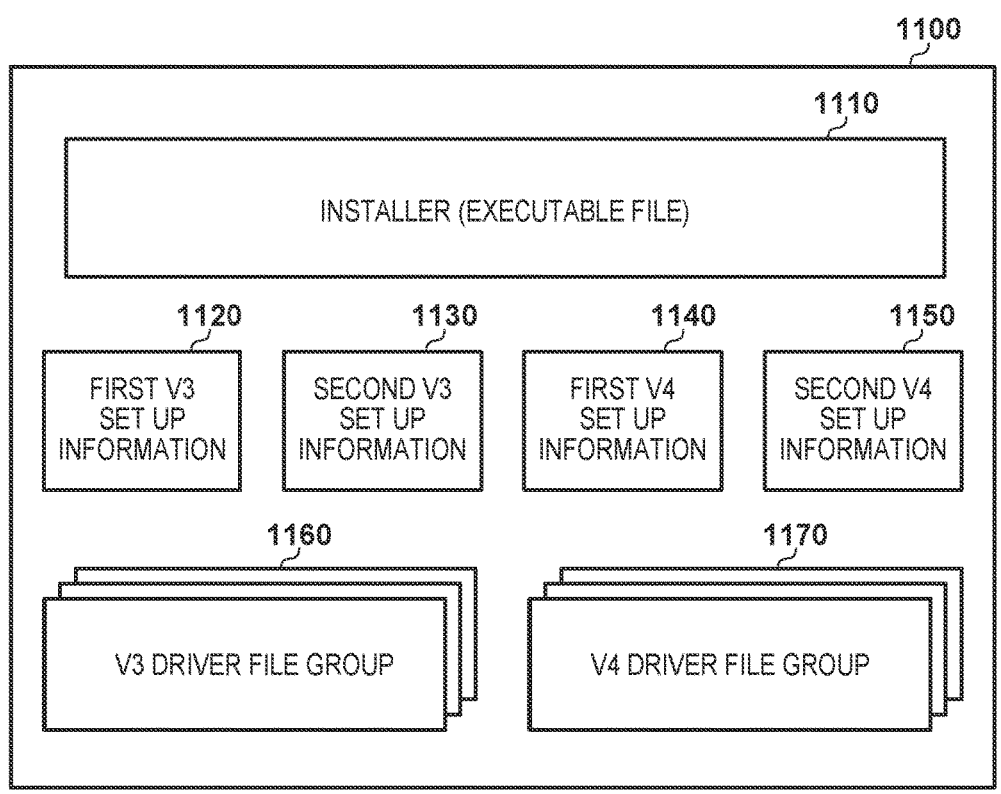
FIG. 4 is a view for illustrating a configuration of an install set of drivers in first and second embodiments.

FIG. 4 is a view for illustrating a configuration of an install set 1100 of a PDL1 printer driver in the present embodiment. The install set 1100 is configured from an installer (executable file) 1110, various driver set up information files 1120 to 1150, and a driver file group for constructing drivers under the OS. Furthermore, the driver file group is configured by a driver file group 1160 of a V3 architecture and a driver file group 1170 of a V4 architecture. An installer 1110 is a program file of an executable format, and is loaded to the memory 1042, and is executed by the CPU 1041 when it is activated by a user on the computer 1000. A driver set up information file is a file in which information necessary in order to install a driver to the computer 1000 is described in a text format. Specifically, version information of a driver, a model name of a driver, a name of a file which configures a driver, and the like are disclosed. The OS 1031 can perform an installation of a driver based on a driver set up information file. Note, the driver set up information file is called an INF file in the Windows (registered trademark) OS. In the present embodiment, there exist 4 types of driver set up information files within the install set 1100 of a driver. A first V3 set up information file 1120 and a second V3 set up information file 1130 are both files for installing V3 architecture drivers. Meanwhile, a first V4 set up information file 1140 and a second V4 set up information file 1150 are both files for installing V4 architecture drivers. Contents of each set up information file will be described later. A V3 driver file group 1160 includes a DLL (dynamic-link library) file for performing UI control, a DLL file for performing rendering processing at a time of print execution, an ICC profile file for color processing or the like, for example. On the other hand, a V4 driver file group 1170 includes a GPD file in which a print setting is described, a JavaScript file which describes a UI conflict, a DLL file which is called a filter for performing rendering processing at a time of a print execution, or the like for example.

<Example of Contents of Set Up Information Files>

Next, description will be given regarding contents of each kind of set up information file using FIG. 5A, FIG. 5B, FIG. 6A, and FIG. 6B. FIG. 5A illustrates contents of the first V3 set up information file 1120. Line 5101 indicates that line 5102 to line 5104 are a [Version] section. In the [Version] section 5101, a class of a driver and a version of the driver are included. A class 5102 indicates that the class of the driver is a driver corresponding to a printer. A manufacturer name 5103 indicates a supply source manufacturer name of the set up information file. Note, "% OEM %" indicates a character sequence which is defined by a "String" section (not shown) which exists in the second half of the file. A version 5104 indicates the version and creation date of the driver.

Regarding line 5106, the subsequent line 5107 indicates a [Manufacturer] section. The [Manufacturer] section 5106 indicates a name of a manufacturer of the device that the driver handles. A manufacturer name 5107 indicates the manufacturer name, and a section name of a model name section corresponding thereto. Here, "Company Name" is designated as the manufacturer name and "Company_Name" is designated as the section name of the model name section. The model name section is a section in which the model name of the printer driver to be installed, and a plug and play ID and driver file group, and the like corresponding thereto are listed.

For line 5109, the subsequent line 5110 and line 5111 indicate a model name section 5109 of a section name called "Company_Name". A model name 5110 indicates a file name of a file group of the printer driver of a model name of "PDL1 Printer" described in a [PDL1] section (not shown). In the [PDL1] section, the file name of each file of the V3 driver file group 1160 and the like are described. Simultaneously the model name 5110 also indicates that a printer driver is installed by the model name of "PDL1 Printer" when plug and play by the PnP ID of "PDL1 (V3)" in WSD Discovery occurs. Note, "WSDPRINT/" of line 5110 indicates that the printer 2000 is a WSD protocol printer. Similarly, a model name 5111 also indicates that a printer driver is installed by the model name of "PDL1 Printer" when plug and play by the PnP ID of "PDL1 (V3)" occurs at a time of a USB connection. Note, "USBPRINT/" of the model name 5111 indicates that the printer 2000 is a USB protocol printer. The first V3 set up information file 1120 is a file which indicates that the V3 driver file group 1160 is installed to the computer when a printer 2000 whose the PnP ID is "PDL1 (V3)" is connected. This does not depend on the connection protocol being WSD or USB.

FIG. 5B illustrates contents of the second V3 set up information file 1130. Description is omitted because line 5201 to line 5211 are already explained in FIG. 5A. For a model name 5212 and 5213, printer drivers to be installed are indicated by a model name of "PDL1 Printer" when a plug and play occurs for a device whose PnP ID is "PDL (V4)". In the second V3 set up information file 1130, the V3 driver file group 1160 to be installed is indicated when a printer 2000 whose the PnP ID is "PDL1 (V3)" or "PDL1 (V4)" is connected to a computer.

A difference between the first V3 set up information file 1120 and the second V3 set up information file 1130 is that a V3 driver is installed at a time of a plug and play of a device whose PnP ID is "PDL1 (V4)" for only the second V3 set up information 1130.

FIG. 6A illustrates contents of the first V4 set up information file 1140. "4.0" is designated as a value in a [Version] section 6101 and a "ClassVer" attribute 6104. This indicates that a set up information file 1140 is the set up information file for installing a V4 driver. Description is omitted regarding other lines because they are the same as in the first V3 set up information file 1120 illustrated in FIG. 5A. The first V4 set up information file 1140 is a file which indicates installation of the V4 driver file group 1170 to the computer when a printer 2000 whose PnP ID is "PDL (V4)" is connected.

FIG. 6B illustrates contents of the second V4 set up information file 1150. A difference with the first V4 set up information file 1140 is that a definition relating to a device whose PnP ID is "PDL1 (V3)" is included in the model name section. For this reason, in the second V4 set up information 1150, the point that a V4 driver is installed at a time of plug and play of a PnP ID of "PDL1 (V3)" is different to the first V4 set up information file 1140.

<Device Driver Install Process by Installer>

Next, using FIG. 7, plug and play install processing of an installer of the present embodiment is described. The installer 1110 which executes these processes is entirely loaded to the memory 1042 and is executed by the CPU 1041. Note, processing illustrated in FIG. 7 indicates an installation control method that can be performed in a state in which a printer for which a printer driver to be installed is not connected to the computer. Note, in the installation control method, a set up process of FIG. 8 described later according the OS is also included. The installer 1110 accepts an installation method input from the user when the installer 1110 is activated by the user (step S701). Regarding an installation method, other than a plug and play install, a custom install which manually designates a port, a search install which automatically performs a network search, or the like exist. Next, the installer 1110 determines whether or not the inputted installation method is a plug and play install (step S702). Although the installer 1110 performs an install process by the method selected in the case when it is determined that something other than a plug and play install is selected (step S711), here description is omitted. The installer 1110 obtains capability information which includes the version information of the OS 1031 and the like in a case when it is determined that a plug and play install is selected (step S703). The installer 1110 determines the architecture of a driver that can be installed to the OS 1031 based on the capability information obtained in step S703 (step S704). Conversely, the capability information is information based on which determination of an architecture of a driver that can be installed to the OS 1031 is possible. The version information of the OS is included in the capability information because the architecture of a driver which can be installed to the OS is determined by the version of the OS. The installer 1110 can perform the determination of step S704 if the installer 1110 has in advance information relating to an association of the version of the OS and of the architecture of a driver that can be installed.

The installer 1110 installs a V3 driver by the second V3 set up information file 1130 in a case when it is determined that the OS 1031 is an OS capable of installing only the printer driver of the V3 architecture (step S705). The installer 1110 installs a V3 driver by the first V3 set up information file 1120 in a case when it is determined that the OS 1031 is an OS capable of installing both the V3 architecture and the V4 architecture (step S706). Furthermore, a V4 driver is also installed by the first V4 set up information (step S708). In other words, both a V3 driver and a V4 driver are installed. Also, the installer 1110 installs a V4 driver by the second V4 set up information in a case when it is determined that the OS 1031 is an OS capable of installing only the printer driver of the V4 architecture (step S707). Note, "install" as recited here indicates that the set up information is designated to the OS 1031 and that the driver is put under management of the OS 1031. A printer object (also called a printer queue) is further generated by plug and play processing (illustrated in FIG. 8) by the OS for a driver under management of the OS 1031. Because of this, it becomes possible for a user to cause a print to be performed by the printer 2000 by using the printer driver. Description is given later regarding a printer object generation timing. The installer 1110 performs an instruction to connect the printer 2000 to the user after installation of the driver according to the capability information of the OS 1031 ends (step S709). After this, the installer 1110 awaits the plug and play processing that the OS 1031 performs (step S710). The installer 1110 ends the processing of the installer if the plug and play processing ends.

<Install Procedure of a Device Driver by an OS>

FIG. 8 describes a flow of plug and play processing that the OS 1031 performs. Here, the plug and play processing indicates processing until the corresponding printer object is generated and the user is enabled to print at a time when the printer 2000 is first connected to the computer. These processes are all loaded to the memory 1042 and are executed by the CPU 1041. Firstly, a plug and play connection of the printer 2000 is detected (step S801). Here, the connection configuration may consider either WSD, USB, or the like. The printer 2000 returns to the computer the PnP ID selected in the system management setting PnP ID illustrated in FIG. 3 at a time of a connection with the computer. The OS 1031 obtains the PnP ID from the printer 2000 when the connection of the printer 2000 is detected (step S802). Next, set up information corresponding to the obtained PnP ID is searched for among the set up information files of the printer drivers installed by the installer 1110 in the procedure of FIG. 7 (step S803).

The target of the search is the model name section of the set up information for example, and an item corresponding to the PnP ID obtained in step S802 is searched for among the model names included in the model name section. For example, a V3 driver in the set up information 1130 illustrated in FIG. 5B is installed, and from the device, "WSDPRINT¥PDL1 (V4)" which combines a PnP ID and a protocol is acquired. In such a case, the model name section 5209 is searched for with a set including the protocol and the PnP ID, in other words in "WSDPRINT¥PDL1 (V4)". In a case when the protocol is separately acquired, it may be combined. In this example, the model name 5212 applies, and so it is possible to identify a file name of the printer driver file group of the model name "PDL1 Printer" from the section name section (not shown) which is "PDL1" as described in the field therefor.

Also, the OS generates a new printer object by the driver of the found set up information (step S804). Furthermore, a port of the printer object is set to a port of the connected printer 2000 (step S805), and processing ends. Note, although the steps illustrated in FIG. 8, particularly the steps of step S804 and step S805 are a part of the printer driver install steps, the procedure of FIG. 7 is called an install, and the procedure of FIG. 8, particularly step S804 and step S805 collectively, is called a set up in order to differentiate from the procedure of FIG. 7.

Note, it is determined whether or not set up information of the installed driver is of a corresponding device class with reference to the class name of the version section in a case when the device class information is obtained from the device upon connection of the device. If it corresponds, the PnP ID obtained from the model name section therein is searched for. In this way, the installed driver is something that is set up only for a device of a maker and a device class that are the same as those of the installed driver.

<Concrete Example>

Description will be given of a concrete example with reference to FIG. 5A, FIG. 5B, FIG. 6A, and FIG. 6B. A "PDL1" section of the set up information exemplified in FIG. 5A, FIG. 5B, FIG. 6A, and FIG. 6B is common to all the set up information. However, the driver file names illustrated in the section may differ between the V3 set up information 1120 and 1130 and the V4 set up information 1140 and 1150. Accordingly, file groups in accordance with V3 and V4 respectively can be installed. However, in one set up information item, a reference of the same section name indicates that the same driver is installed because section names are unique. In the example of FIG. 5B, a driver installed by the second V3 set up information 1130 in the procedure of FIG. 7 is a driver group of the file name described in the "PDL1" section, in other words a predefined driver (a V3 driver in this example), irrespective of whether the PnP ID of the printer is "PDL1 (V3)" or "PDL1 (V4)" for example. Set up of the V3 driver is performed by the procedure of FIG. 8. In such a case, a printer that the user can use is a printer object set up by a V3 driver in accordance with a PnP ID value of "PDL (V3)", in other words a virtual printer. Also, for example, in the case where a V4 driver is installed by the second V4 set up information 1150 illustrated in FIG. 6B, the same V4 driver are installed irrespective of whether the PnP ID of the printer is "PDL1 (V3)" or "PDL1 (V4)". Then, set up is performed by a printer driver of a file name defined in the "PDL1" section by the procedure of FIG. 8. Accordingly, in such a case, a printer that the user can use is a printer object set up by a V4 driver in accordance with a PnP ID value of "PDL1 (V4)", in other words a virtual printer.

In contrast to this, the V3 driver in the first V3 set up information and the V4 driver in the first V4 set up information are installed in step S705 and step S707 of FIG. 7. In such a case, set up is performed by a V3 driver if the PnP ID is "PDL1 (V3)" and by a V4 driver if the PnP ID is "PDL1 (V4 )". Accordingly, in such a case, a printer that the user can use is a printer object set up by a V3 driver in accordance with a PnP ID value of "PDL1 (V3)", in other words a virtual printer. Meanwhile, if it is "PDL1 (V4)" then it is a printer object set up by a V4 driver, in other words a virtual printer.

<Effect of the Embodiment>

The following effects can be achieved by performing an install of a driver by flows as described in FIG. 7 and FIG. 8. In other words, it becomes possible on an OS, on which only a V3 driver can be installed, to print using a V3 driver whether the PnP ID from the printer 2000 is "PDL (V3)" for a V3 driver or "PDL (V4)" for a V4 driver. It becomes possible to similarly print using a V4 driver, even for an OS on which it is similarly only possible to install a V4 driver. Furthermore, it becomes possible to print using a driver of an architecture that a system administrator designated by the panel 2120 of the printer 2000 for an OS capable of installing both V3 and V4.

Second Embodiment

In the first embodiment, a method of installing drivers of architectures respectively designated by the panel 2120 of the printer 2000 for an OS capable of installing both a printer driver of a V3 architecture and a printer driver of a V4 architecture is described. However, the capabilities of the V3 driver and the V4 driver are respectively different and there are differences in what they can do. For this reason, there are use cases in which it is desired that a V4 driver be installed preferentially for an OS capable of installing both the V3 driver and the V4 driver depending on the environment. The second embodiment is configured to be able to handle such a case.

Figure 9A:
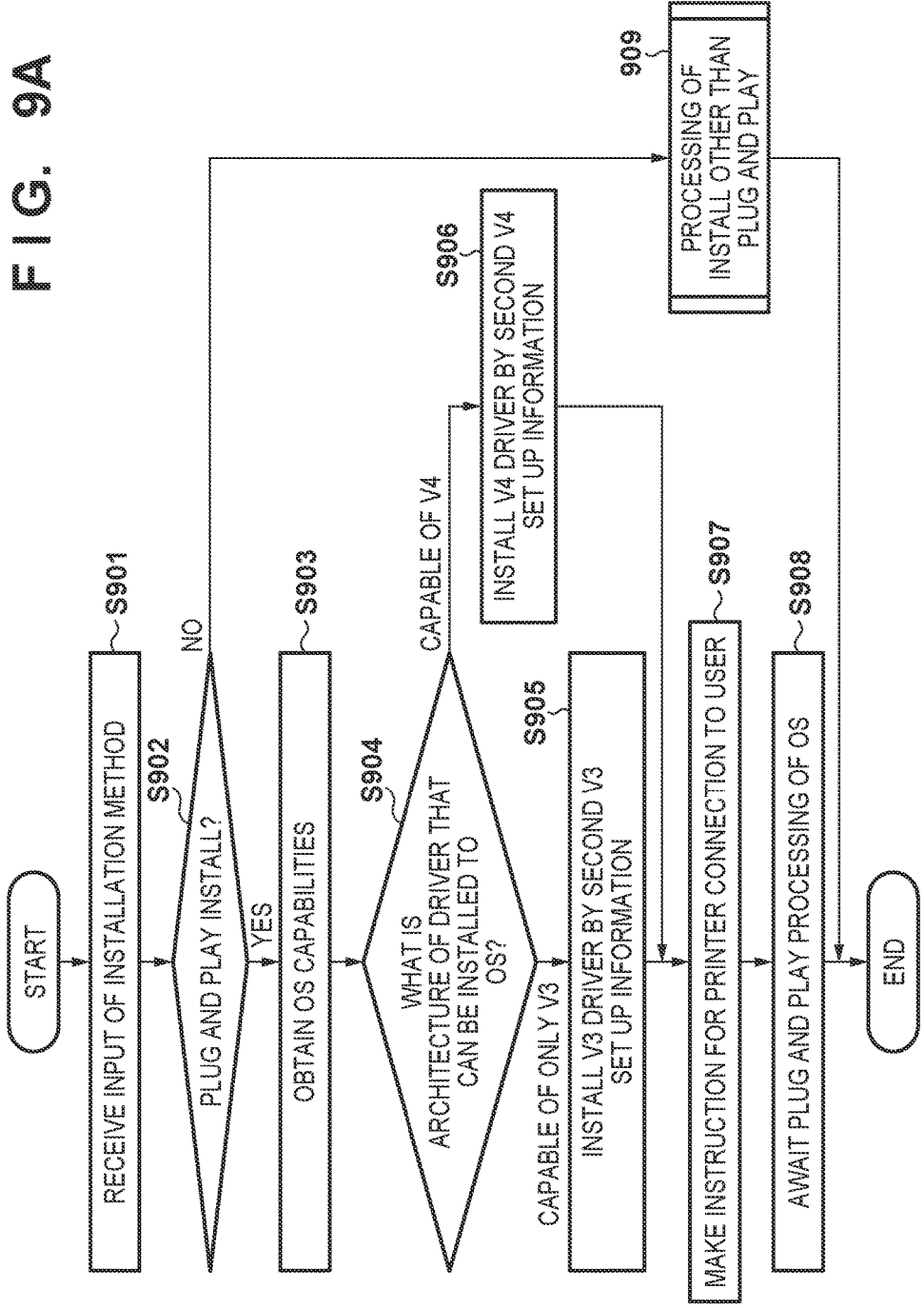

FIG. 9A illustrates plug and play install processing of the installer 1110 in the second embodiment. These processes are all loaded to the memory 1042 and are executed by the CPU 1041. A point of difference with the first embodiment is the contents of an operation that the installer 1110 performs in accordance with an architecture of a driver that can be installed to the OS 1031. A V3 driver is installed by the second V3 set up information file 1130 similarly to the first embodiment for an OS capable of installing only a V3 driver (step S905). Meanwhile, a V4 driver is installed using the second V4 set up information for all OSes capable of installing a V4 driver (step S906). By this, it is possible to preferentially generate a printer object of a V4 driver in the OS 1031 even if the setting of the PnP ID in the printer panel 2120 is "PDL (V3)" for an OS capable of installing both V3 and V4. Descriptions of other operations or configuration elements are omitted because they are the same as what is described in the first embodiment.

FIG. 9B illustrates a processing flow of the installer 1110 for the flow illustrated in FIG. 9A corresponding to an opposite use case. These processes are entirely loaded to the memory 1042 and are executed by the CPU 1041. A V4 driver is installed using the second V4 set up information for OSes only capable of installing a V4 driver (step S916). Meanwhile, a V3 driver is installed using the second V3 set up information file 1130 for all OSes capable of installing a V3 driver (step S915). In this way, it is possible to preferentially generate a printer object of a V3 driver in the OS 1031 even if the setting of the PnP ID in the printer panel 2120 is "PDL (V4)" for an OS 1031 capable of installing both V3 and V4.

Although it is possible for the flow illustrated in FIG. 9A and the flow illustrated in FIG. 9B to be independently implemented, it is also possible to implement to allow a user to select which flow to install by including the flow (FIG. 7) of the first embodiment. In other words, the installer 1110 allows the user to select prior to installing which flow out of FIG. 7, FIG. 9A, and FIG. 9B to executed using the UI. Configuration may be taken such that this selection may be performed by a selection of the version of the driver to prioritize, for example, and such that FIG. 9A is executed if the V4 driver is selected, FIG. 9B is executed if the V3 driver is selected, and FIG. 7 is executed if a priority order is not selected. By this, there is the effect that it is possible to freely control the architecture of a driver that a user desires to plug and play install regardless of the setting of a PnP ID in the printer panel 2120. Also, a problem that a driver cannot be installed due to the capability information of the OS 1031 does not occur.

Third Embodiment

Figure 10:
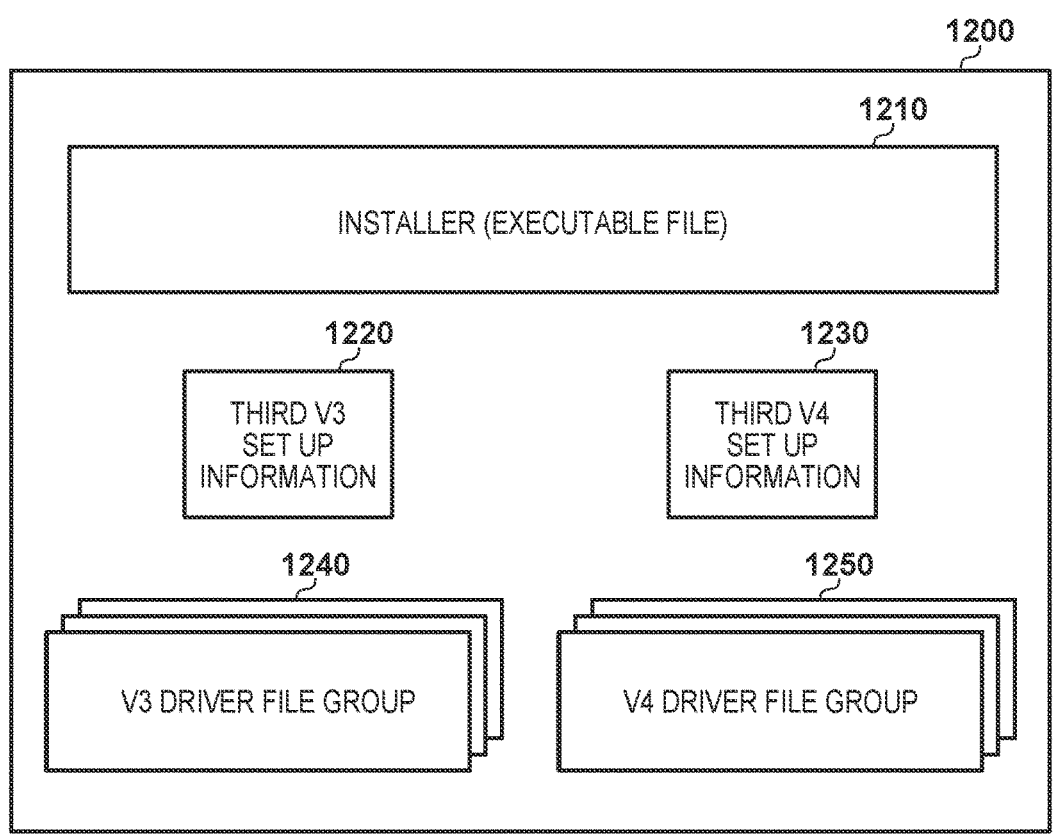
FIG. 10 is a view for illustrating a configuration of an install set of drivers in a third embodiment.

Here, description is given regarding a method in which the present invention is implemented by preparing set up information files that are different from the first embodiment and the second embodiment. FIG. 10 is a view for illustrating a configuration of a printer driver install set 1200 in the third embodiment. Description of an installer 1210, and driver file groups 1240 and 1250 are omitted because they are the same as in the first embodiment. A difference with the first embodiment is that third V3 set up information 1220 and third V4 set up information 1230 are used to install a printer driver. Also, an driver install procedure by the installer 1210 is something in which both "first" and "second" in step S705 to step S708 of FIG. 7 are read as "third". Alternatively, an install which uses the third V3 set up information and an install which uses the third V4 set up information may be unconditionally performed without determining the capabilities of an OS.

FIG. 11A illustrates the contents of the third V3 set up information file 1220. Description of a [Version] section 7101 is omitted because it is the same as the first V3 set up information file 1120. In the manufacturer name 7107 within the [Manufacturer] section 7106, the versions of each OS are listed separated by "," to the side of the description "Company_Name" which is the section name of the model name section. Because of this, it becomes possible to describe the model name section which continues later to each OS version. In the present example, the section name of the model name section is illustrated separating it into the model name and the version by periods. For a model name section 7109, the subsequent line 7110 to line 7113 indicate the model name section of the section name which is [Company_Name.OS_A]. Furthermore, for a model name section 7115, the subsequently following line 7116 to line 7117 indicate the model name section of the section name which is [Company_Name.OS_B]. In this way, the model name section of the set up information file is described for each OS version. For the OS version, there is also information which indicates the version of a driver that can be installed in that OS. With this, the OS controls what driver targeting a PnP ID is associated and installed depending on the version of the OS that this the target of installation, in other words the capability information. In the present embodiment, OS_A is assumed to be an OS capable of installing only a driver of the V3 architecture and OS_B is assumed to be an OS capable of installing both a driver of the V3 architecture and a driver of the V4 architecture. Furthermore, OS_C is assumed to be an OS capable of installing only a driver of the V4 architecture. In step S803 of FIG. 8, when the version of an OS is described in the manufacturer name 7107 within the [Manufacturer] section 7106, the OS searches for a model name section of a name which includes the version. Furthermore, a search of an obtained PnP ID including a protocol is made within the corresponding section. A V3 install is possible in OS_A regardless of the PnP ID by using the third V3 set up information file 1220 and in OS_B a V3 install is possible only at a time when the PnP ID is "PDL1 (V3)".

FIG. 11B illustrates the contents of the third V4 set up information file 1230. A detailed description is omitted because of repetition. The V4 driver can be installed regardless of the PnP ID in OS_C by using these and the V4 driver can be installed in OS_B only at a time when the PnP ID is "PDL1 (V4)". In other words, the same effect of the first embodiment can be achieved at a time of a plug and play install by installing beforehand both the third V3 set up information file 1220 and the third V4 set up information file 1230.

As above, description is given using the drawings for embodiments of the present invention and the effects thereof using the first embodiment to the third embodiment. Note, known techniques that are unrelated to the effect of the present invention are omitted from the description. Regarding details of the processing flow, the contents of the set up information file or the like, implementation may not be as in the present embodiments. Furthermore, although, in the present embodiments, description is made targeting mainly a "PDL1" driver, the same effect can be achieved by implementing similarly for "Fax" or "PDL2". Also, in the present embodiment, although description is given using a Windows (registered trademark) OS as the OS 1031 of the computer 1000, implementation may be in another OS.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-252410, filed Dec. 24, 2015, which is hereby incorporated by reference herein in its entirety.

What is claimed is:

1. An information processing apparatus comprising,
a memory storing an installer including a set of instructions for controlling an install of at least one device driver among devices drivers of two architectures, using a driver file that includes information for constructing the device drivers of the two architectures, which are a new architecture and an old architecture; and
a processor for executing the set of instructions to cause the information processing apparatus to:
obtain specific information specifying an operating system that controls execution of the set of instructions included in the installer;
communicate with a peripheral apparatus to receive identification information from the peripheral apparatus, the identification information indicating a type of a device driver to be installed in the information processing apparatus; and
control, in a case when it is determined that the operating system is an operating system that can install either of the device drivers of the two architectures in accordance with the obtained specific information, or, in a case when it is determined that the operating system is an operating system that can install only a device driver of the new architecture in accordance with the obtained specific information, to install the device driver of the new architecture using the driver file,
wherein, in a case when it is determined that the operating system can install only the device driver of the new architecture and the type of the device driver indicated by the received identification information is a device driver of the old architecture, a set up of the installed device driver of the new architecture is performed for the peripheral apparatus, by using set up information for the device driver of the new architecture, and
wherein, in a case when it is determined that the operating system can install both of the device drivers of the two architectures and the type of the device driver indicated by the received identification information is the device driver of the old architecture, a set up of the installed device driver of the new architecture is performed for the peripheral apparatus, by using the set up information for the device driver of the new architecture.

2. The information processing apparatus according to claim 1, wherein the instructions further cause the information processing apparatus to control, in a case when it is determined that the operating system is an operating system that can install only a device driver of the old architecture in accordance with the obtained specific information, to install the device driver of the old architecture using the driver file, and
wherein, in a case when it is determined that the operating system can install only the device driver of the old architecture and the type of the device driver indicated by the received identification information is a device driver of the new architecture, a set up of the installed device driver of the old architecture is performed for the peripheral apparatus, by using set up information for the device driver of the old architecture.

3. The information processing apparatus according to claim 1, wherein the instructions further cause the information processing apparatus to control, in a case when it is determined that the operating system is an operating system that can install either of the device drivers of the two architectures in accordance with the obtained specific information, to install the device driver of the old architecture in addition to the device driver of the new architecture, and
wherein, when it is determined that the operating system can install both of the device drivers of the two architectures, a set up of one of the installed device drivers of the two architectures is performed by using set up information for the device driver of the one architecture corresponding to the identification information obtained from the peripheral apparatus.

4. The information processing apparatus according to claim 1, wherein the set up information for the device driver of the new architecture includes information for installing a device driver of a predetermined architecture regardless of identification information obtained from a peripheral apparatus.

5. The information processing apparatus according to claim 1, wherein the device driver is a printer driver or a facsimile driver.

6. The information processing apparatus according to claim 1, wherein the received identification information is a plug and play ID.

7. An installation control method, the method comprising:
performing an install in an information processing apparatus of at least one device driver among device drivers of two architectures, using an installer including a driver file that includes information for constructing the device drivers of the two architectures, which are a new architecture and an old architecture, said performing comprising
obtaining specific information specifying an operating system that controls execution of the installer;
communicating with a peripheral apparatus to receive identification information from the peripheral apparatus, the identification information indicating a type of a device driver to be installed in the information processing apparatus; and
controlling, in a case when it is determined that the operating system is an operating system that can install either of the device drivers of the two architectures in accordance with the obtained specific information, or, in a case when it is determined that the operating system is an operating system that can install only a device driver of the new architecture in accordance with the obtained specific information, to install the device driver of the new architecture using the driver file,
wherein, in a case when it is determined that the operating system can install only the device driver of the new architecture and the type of the device driver indicated by the received identification information is a device driver of the old architecture, a set up of the installed device driver of the new architecture is performed for the peripheral apparatus by using set up information for the device driver of the new architecture, and
wherein, in a case when it is determined that the operating system can install both of the device drivers of the two architectures and the type of the device driver indicated by the received identification information is the device driver of the old architecture, a set up of the installed device driver of the new architecture is performed for the peripheral apparatus, by using the set up information for the device driver of the new architecture.

8. An installation control method, the method comprising:
performing an install in an information processing apparatus of at least one device driver among device drivers of two architectures, using an installer including a driver file that includes information for constructing the device drivers of the two architectures, which are a new architecture and an old architecture, said performing comprising
obtaining specific information specifying an operating system that controls execution of the installer;
communicating with a peripheral apparatus to receive identification information from the peripheral apparatus, the identification information indicating a type of a device driver to be installed in the information processing apparatus; and
controlling, in a case when it is determined that the operating system is an operating system that can install either of the device drivers of the two architectures in accordance with the obtained specific information, or, in a case when it is determined that the operating system is an operating system that can install only a device driver of the old architecture in accordance with the obtained specific information, to install the device driver of the old architecture using the driver file,
wherein, in a case when it is determined that the operating system can install only the device driver of the old architecture and the type of the device driver indicated by the received identification information is a device driver of the new architecture, a set up of the installed device driver of the old architecture is performed for the peripheral apparatus, by using set up information for the device driver of the old architecture, and
wherein, in a case when it is determined that the operating system can install both of the device drivers of the two architectures and the type of the device driver indicated by the received identification information is the device driver of the new architecture, a set up of the installed device driver of the old architecture is performed for the peripheral apparatus, by using the set up information for the device driver of the old architecture.

9. A non-transitory computer-readable storage medium for causing a computer to execute an installation control method, the method comprising:
performing an install to an information processing apparatus of at least one device driver among device drivers of two architectures, using an installer including a driver file that includes information for constructing the device drivers of the two architectures, which are a new architecture and an old architecture, the performing comprising
obtaining specific information specifying an operating system that controls execution of the installer;
communicating with a peripheral apparatus to receive identification information from the peripheral apparatus, the identification information indicating a type of a device driver to be installed in the information processing apparatus; and
controlling, in a case when it is determined that the operating system is an operating system that can install either of the device drivers of the two architectures in accordance with the obtained specific information, or, in a case when it is determined that the operating system is an operating system that can install only a device driver of the new architecture in accordance with the obtained specific information, to install the device driver of the new architecture using the driver file,
wherein, in a case when it is determined that the operating system can install only the device driver of the new architecture and the type of the device driver indicated by the received identification information is a device driver of the old architecture, a set up of the installed device driver of the new architecture is performed for the peripheral apparatus by using set up information for the device driver of the new architecture, and
wherein, in a case when it is determined that the operating system can install both of the device drivers of the two architectures and the type of the device driver indicated by the received identification information is the device driver of the old architecture, a set up of the installed device driver of the new architecture is performed for the peripheral apparatus, by using the set up information for the device driver of the new architecture.

10. A non-transitory computer-readable storage medium for causing a computer to execute an installation control method, the method comprising:

performing an install to an information processing apparatus of at least one device driver among device drivers of two architectures, using an installer including a driver file that includes information for constructing the device drivers of the two architectures, which are a new architecture and an old architecture, the performing comprising obtaining specific information specifying an operating system that controls execution of the installer;

communicating with a peripheral apparatus to receive identification information from the peripheral apparatus, the identification information indicating a type of a device driver to be installed in the information processing apparatus; and controlling, in a case when it is determined that the operating system is an operating system that can install either of the device drivers of the two architectures in accordance with the obtained specific information, or, in a case when it is determined that the operating system is an operating system that can install only a device driver of the old architecture in accordance with the obtained specific information, to install the device driver of the old architecture using the driver file, wherein, in a case when it is determined that the operating system can install only the device driver of the old architecture and the type of the device driver indicated by the received identification information is a device driver of the new architecture, a set up of the installed device driver of the old architecture is performed for the peripheral apparatus, by using set up information for the device driver of the old architecture, and wherein, in a case when it is determined that the operating system can install both of the device drivers of the two architectures and the type of the device driver indicated by the received identification information is the device driver of the new architecture, a set up of the installed device driver of the old architecture is performed for the peripheral apparatus, by using the set up information for the device driver of the old architecture.

* * * * *